United States Patent [19]

Brunbeck et al.

[11] 4,454,048

[45] Jun. 12, 1984

[54] TREATING WASTE WATER CONTAMINATED WITH A LOW CONCENTRATION OF LATEX

[75] Inventors: Richard T. Brunbeck; Joseph C. Sherwood, both of Reading, Pa.

[73] Assignee: SCM Corporation, New York, N.Y.

[21] Appl. No.: 487,919

[22] Filed: Apr. 22, 1983

Related U.S. Application Data

[63] Continuation-in-part of Ser. No. 346,958, Feb. 8, 1982, Pat. No. 4,383,928, which is a continuation-in-part of Ser. No. 215,694, Dec. 12, 1980, abandoned.

[51] Int. Cl.$^3$ .............................................. C02F 1/52
[52] U.S. Cl. .................................... 210/726; 210/751; 210/908
[58] Field of Search .............. 210/724, 751, 716, 908, 210/909, 726

[56] References Cited

U.S. PATENT DOCUMENTS

| | | | |
|---|---|---|---|
| 3,753,901 | 8/1973 | Taubman et al. | 210/49 |
| 3,947,283 | 3/1976 | Uchikawa et al. | 106/89 |
| 3,980,558 | 9/1976 | Thompson | 210/59 |
| 4,071,449 | 1/1978 | Inoue et al. | 210/724 X |
| 4,096,061 | 6/1978 | Brennan | 210/45 |
| 4,116,705 | 9/1978 | Chappell | 106/90 |
| 4,149,968 | 4/1979 | Kupiec et al. | 210/28 |
| 4,230,568 | 10/1980 | Chappell | 210/751 |
| 4,312,759 | 1/1982 | Sherwood et al. | 210/710 |
| 4,383,928 | 5/1983 | Sherwood et al. | 210/724 |

*Primary Examiner*—Thomas G. Wyse
*Attorney, Agent, or Firm*—A. Joseph Gibbons

[57] ABSTRACT

The separability of latex floc dispersed in water is improved by adding a small proportion of portland cement thereto.

5 Claims, No Drawings

TREATING WASTE WATER CONTAMINATED WITH A LOW CONCENTRATION OF LATEX

This application is a continuation-in-part of application Ser. No. 346,958 of Feb. 8, 1982, now U.S. Pat. No. 4,383,928 issued May 17, 1983, which itself was a continuation-in-part of now-abandoned application Ser. No. 215,694 of Dec. 12, 1980.

This invention relates to a process for the treatment of aqueous latex wastes, typically those from manufacturing, packaging, and using surface coatings containing a film-forming latex vehicle. The economic disposal of such wastes in a leach-resistant condition has become an important aspect of plant operation.

BACKGROUND OF THE INVENTION

These latices commonly have an average molecular weight of 100,000 or more. They are stable suspensions whose average latex particle size typically is about 2,000–5,000 Å, or even larger. Latex concentration in the waste dealt with here ordinarily is about 1–6% by weight; rarely does it reach as much as 20%. While such latices may at times have a bit of ionic functionality in their molecular structures, they are to be distinguished from the more highly ionizable lyophobic colloid-type coating resins and resinous mixtures made for aqueous dispersion such as those shown in Example 1 of our parent application Ser. No. 346,958. The latter resins typically have average molecular weight below 40,000, and they disperse into water in a much finer particulate condition.

In said parent application we have shown a practical way to form a leach-resistant consolidate of low volume from the thinly-dispersed, comparatively low molecular weight resinous material and from latex wastes that are structurally fairly acidic or, if practically neutral, are deliberately acidulated. The process of said parent application involves using portland cement to flocculate the dispersoid and collecting the resulting small volume cementiferous floc. Such processing is to be distinguished from prior proposals for converting an initial volume of waste water (including one containing dispersed polymer) into a massive concretion with portland cement and aggregate (for example, as shown in U.S. Pat. Nos. 4,116,705 and 4,149,968). Such resulting concretion (for landfill or other disposal) can be larger than the original volume of the aqueous waste submitted to treatment.

Heretofore it has been proposed to flocculate and settle latex for disposal using, for example, flocculants including complex organic ones. Such processes are slow, often expensive, and frequently they produce a waste mass or sludge that can be difficult to handle. In our U.S. Pat. No. 4,132,759 of Jan. 26, 1982, we have shown an efficient way to form a leach-resistant consolidate from aqueous latex paint wastes. The process involves flocculating such waste with an organic flocculating agent, then heating the waste body to a fairly high temperature. The process is reasonably rapid. The sludge consolidates well, and it can be handled with facility.

The instant invention is distinguishable from the process of our U.S. Pat. No. 4,132,759 in that it uses a little cement, rather than the heating of the entire aqueous waste mass, in the process of obtaining the leach-resistant consolidate; the resulting consolidate is a more brittle one (because of the cement addition). Unlike the process of the parent application here, the cement in the instant operation can be used in a much lesser effective proportion, and it is not used as a flocculant, but rather to enhance, surprisingly, the separability of a floc already initiated. The resulting cementiferous sludge is of relatively minor volume in comparison to the volume of the aqueous waste submitted to such treatment. This, of course, is in sharp contrast to concretion processes referred to above which employ cement.

BROAD STATEMENT OF THE INVENTION

Our invention for treating a body of waste water contaminated with a low concentration of suspended latex comprises: destabilizing the latex of said body into a floc of small particulates; enhancing separability of said floc by blending a small proportion of portland cement into the destabilized suspension; and separating resulting cementiferous sludge from remaining aqueous material.

DETAILED DESCRIPTION OF THE INVENTION

The portland cement for this process can be any common type of such cement. Desirably it has a Blaine number of at least about 3,000 sq. cm./gm. It need not have good light color, but can be an ordinary grayish sort.

The latex solids for removal by the instant process can be various. Typically they are used as film-forming binders in surface coatings or paint. In the latter aspect they can be associated with the usual fillers, opacifying and/or coloring pigments, and other conventional latex paint ingredients. Latices having acrylic monomer incorporated into their molecular structure are the most common and present most of the disposal problems today, particularly those having a small hydroxylated and/or carboxylic acid monomer unit content. Many of this sort find industrial application in coil coatings, board coatings, primers and topcoats. Aqueous wastes from these operations often are vexing to dispose of, especially ones that are alkaline.

Aqueous latex dispersions can be destabilized in a variety of ways. The addition of flocculating agents such as complex organic ones has already been mentioned. Alums and other conventional water-soluble inorganic flocculants are quite inexpensive, and they are advantageous in the instant process for efficiency and economy. Of these we prefer most highly technical grades of papermakers alum, empirically $Al_2(SO_4)_3.18H_2O$, and potash alum, empirically $K_2Al_2(SO_4).24H_2O$, for just such reasons.

In the destabilization we find it advantageous to use such inorganic flocculant in as high a dilution as is effective for initiating the formation of a tiny, grainy floc (floccules). Concentrated addition of such flocculant, as in powder or concentrated solution form, tends to give a large volume, amorphous-looking floc which is disadvantageous for further processing. The dosage of preferred flocculant need not be substantially in excess of about a gram of equivalent aluminum per gallon of the body of waste water submitted to treatment; advantageously it is much lower, e.g. about 0.1–0.2. We have found it quite practical to use aqueous flocculant solutions containing about 1–3% by weight of the preferred flocculants for in-plant use, and, to preclude operator errors with the possible obtention of a messy, amorphous-appearing floc, the aqueous solution of aluminum sulfate and/or potassium-aluminum sulfate should not be in a concentration that contains substantially more than about 2% of equivalent aluminum. Other useful water-soluble inorganic flocculants include sodium aluminum sulfate, ferric sulfate, ferrous sulfate, ferric ammonium sulfate, ferric chloride, sodium aluminate, and even hydrated or partially hydrolyzed aluminum chloride (although chlorine-bearing materials tend to be corrosive toward steel equipment and iron-bearing flocculants can give rise to undesirable coloration in effective dosages and therefore are not preferred). Advantageously the dilute flocculant solution is added into the destabilized latex aqueous body with moderate stirring; extended and/or high intensity mixing tends to break up flocs, and that can be counterproductive in the instant operation.

The operation can be done effectively at room temperature, e.g. 60°–80° F., in small or large vessels and at atmospheric pressure for efficiency and economy. Ordinary mild steel equipment is preferred where corrosion tendencies are not evident. When the latex in the body of waste water has been destabilized into a floc of small particles, the portland cement can be stirred in. A practical proportion of cement generally for in-plant use is one that is roughly equal to the weight (dry basis) of the suspended latex present in the waste water to obtain effective and foolproof operation. It rarely is less than about a 0.2 pound per pound of the latex in the body of the waste water treated. At the expense of more cement, the cement proportion can be raised to about 2 pounds per pound of latex in said body (where a more brittle precipitate is desired or the waste water is richer than ordinary in suspended latex).

The cement appears to agglomerate the small particulates of the floc, and, because of this agglomeration, separability of the floc from remaining aqueous material is considerably enhanced. The settling rate is decidedly increased because of this agglomeration and probably also because of density added by the cement; the cementiferous sludge dewaters and consolidates well. While such sludge can be separated from resulting clarified water by conventional filtration or centrifugation, we find it less expensive and quite adequate simply to allow the floc to settle as a sludge, then consolidate for a number of hours. A clarified supernatant water can be decanted with ease. In 16 to 24 hours (or even longer) the sludge embrittles. If, while still slack and tractable, the sludge is formed into a block even with the possible addition of a filler such as sand, it could be used as a structural unit. However, ordinarily the resulting consolidate simply is disposed of as landfill. Such consolidate does not tend to adhere to the vessel in which it is formed, and it can form under water.

The following examples show how the invention has been practiced, but should not be construed as limiting it. In this specification all parts are parts by weight, all percentages are weight percentages, and all temperatures are in °F. unless otherwise expressly indicated.

EXAMPLE 1

Wash water from the manufacture of an exterior acrylic latex paint was the waste processed. The waste had an amino odor, and its pH was about 9; it contained about 3½% of the latex in stable suspension. To 850 parts of this wash water there was added, with stirring, 25 parts of a 2% by weight aqueous solution of technical grade potash alum. The stirring was continued for 5 minutes to generate an initial floc of small, grainy particulates, and into this was blended 30 parts of Allentown Type I portland cement having Blaine No. of 3,200. After 2 more minutes the stirring was discontinued, and the floc was allowed to settle for 2 hours. The resulting clear supernatant liquid was decanted off, and the remaining settled slack sludge was allowed to consolidate in place at room temperature. The volume of such supernatant liquid was about 80% of that of the original wash water and the sludge about 20%. The sludge hardened in 24 hours into a brittle solid, and a very small amount of remaining clear aqueous serum was poured off.

EXAMPLE 2

The process of claim 1 was repeated, but this time the flocculation was done with 25 parts of a 2% by weight aqueous solution of papermakers alum. The results were virtually the same.

EXAMPLE 3

An aliquot of the brittle sludge of Example 1 was dried for about 3 hours in an 180° F. oven. (This approximates about a week of air drying of such sludge.) The dried sample was submitted for Extraction Procedure Leachate analysis as prescribed by the Resource Conservation and Recovery Act (RCRA) to determine its resistance to leaching in a landfill.

The leachate analysis was made by an independent laboratory in accordance with EPA Extraction Procedure. In this preparation 100 grams of the dried sludge was ground up and placed into 1,600 ml. of high purity water and stirred for 24 hours. The initial pH was 11.4. 400 ml. of 0.5N acetic acid was added to the slurry. The final pH was 11.1. The slurry, diluted to 2,000 ml., was filtered through a 0.45 micron filter. Its analysis is listed below under the column labeled "Actual Value".

| Contaminant | Actual Value | EPA* MCL |
| --- | --- | --- |
| Arsenic, Mg./L as As | 0.002 (2 ppm) | 5.0 |
| Barium, Mg./L as Ba | 0.630 | 100.0 |
| Cadmium, Mg./L as Cd | 0.030 | 1.0 |
| Chromium, Mg./L as Cr | 0.170 | 5.0 |
| Lead, Mg./L as Pb | 0.400 | 5.0 |
| Mercury, Mg./L as Hg | 0.0005 | 0.2 |
| Selenium, Mg./L as Se | 0.002 | 1.0 |
| Silver, Mg./L as Ag | 0.060 | 5.0 |

*The values listed in this column are 100 times the "Maximum Contaminant Levels" as set by the Safe Water Drinking Act.

From the foregoing analysis it can be seen that the consolidate would qualify for disposal in a municipal landfill having an asphalt liner and a leachate basin. It contained substantially less contamination than is permitted by RCRA standards as specified by the U.S. Environmental Protection Agency.

What is claimed is:

1. A process for treating a body of waste water contaminated with a low concentration of suspended latex which comprises:
   destabilizing the latex of said body into a floc of small particulates wherein said destabilization is effected by admixing a dilute aqueous solution of inorganic flocculant with said body;
   enhancing separability of said floc by blending a small proportion of portland cement into the destabilized suspension; and
   separating resulting cementiferous sludge from remaining aqueous material.

2. The process of claim 1 wherein the proportion of cement used is between about 0.2 and about 2 pounds per pound of latex in said body.

3. The process of claim 1 wherein said dilute flocculant solution contains aluminum sulfate and/or potassium aluminum sulfate in a concentration that is not substantially in excess of about 2% based on equivalent aluminum, and dosage of said flocculant is not substantially in excess of about a gram of equivalent aluminum per gallon of said body of waste water.

4. The process of claim 1 wherein said waste water is alkaline.

5. The process of claim 1 wherein the separation of said sludge includes the settling of same.

* * * * *